US010282413B2

(12) United States Patent
Ji (10) Patent No.: US 10,282,413 B2
(45) Date of Patent: May 7, 2019

(54) DEVICE FOR GENERATING ALIGNED CORPUS BASED ON UNSUPERVISED-LEARNING ALIGNMENT, METHOD THEREOF, DEVICE FOR ANALYZING DESTRUCTIVE EXPRESSION MORPHEME USING ALIGNED CORPUS, AND METHOD FOR ANALYZING MORPHEME THEREOF

(71) Applicant: SYSTRAN INTERNATIONAL CO., LTD., Seoul (KR)

(72) Inventor: Chang Jin Ji, Seoul (KR)

(73) Assignee: SYSTRAN INTERNATIONAL CO., LTD., Seoul (KR)

( * ) Notice: Subject to any disclaimer, the term of this patent is extended or adjusted under 35 U.S.C. 154(b) by 94 days.

(21) Appl. No.: 15/026,275

(22) PCT Filed: Aug. 27, 2014

(86) PCT No.: PCT/KR2014/007959
§ 371 (c)(1),
(2) Date: Mar. 31, 2016

(87) PCT Pub. No.: WO2015/050321
PCT Pub. Date: Apr. 9, 2015

(65) Prior Publication Data
US 2016/0217122 A1 Jul. 28, 2016

(30) Foreign Application Priority Data
Oct. 2, 2013 (KR) .................. 10-2013-0118062

(51) Int. Cl.
G06F 17/27 (2006.01)
G06F 17/30 (2006.01)
G06N 99/00 (2010.01)

(52) U.S. Cl.
CPC ............ *G06F 17/273* (2013.01); *G06F 17/27* (2013.01); *G06F 17/2735* (2013.01);
(Continued)

(58) Field of Classification Search
None
See application file for complete search history.

(56) References Cited

U.S. PATENT DOCUMENTS 5,477,448 A * 12/1995 Golding ............... G06F 17/274
704/9
6,708,311 B1 * 3/2004 Berstis .................. G06F 17/273
715/205
(Continued)

FOREIGN PATENT DOCUMENTS

CN 1591415 3/2005
CN 1673997 9/2005
(Continued)

*Primary Examiner* — Thuykhanh Le
(74) *Attorney, Agent, or Firm* — Lex IP Meister, PLLC (57) ABSTRACT

Disclosed is a device for generating an aligned corpus based on unsupervised-learning alignment, and a method thereof, a device for analyzing a destructive expression morpheme using an aligned corpus, and a method for analyzing a morpheme thereof.
The morpheme analyzing device includes a knowledge database and an analyzer. The knowledge database includes an aligned corpus for storing a plurality of knowledge information sets used for a per-language morpheme analysis, and stores a morpheme dictionary for storing morpheme information corresponding to a normal expression and normal expression information corresponding to a destructive expression (here, the destructive expression represents an expression that is erroneous in orthography or is not normalized and standardized). The analyzer performs a morpheme analysis on an input separate word by use of the knowledge database and outputs an analysis result, and
(Continued)

when a morpheme on the input separate word is not provided in the morpheme dictionary, finds a normal expression corresponding to the destructive expression by use of the aligned corpus regarding the destructive expression included in the input separate word, and performs a morpheme analysis.

12 Claims, 9 Drawing Sheets

(52) U.S. Cl.
CPC .......... *G06F 17/2755* (2013.01); *G06F 17/30* (2013.01); *G06N 99/005* (2013.01)

(56) References Cited

U.S. PATENT DOCUMENTS

| | | | |
|---|---|---|---|
| 7,043,422 B2 | 5/2006 | Gao et al. | |
| 2002/0013694 A1* | 1/2002 | Murata | G06F 17/271 704/9 |
| 2003/0061030 A1* | 3/2003 | Kuboyama | G06F 17/2755 704/9 |
| 2003/0097252 A1* | 5/2003 | MacKie | G06F 17/2755 704/9 |
| 2003/0236668 A1* | 12/2003 | Gavieiro-Villatte | G06F 17/2755 704/274 |
| 2004/0148156 A1* | 7/2004 | Hawkins | G06F 17/273 704/10 |
| 2005/0131931 A1* | 6/2005 | Kawajiri | G06F 17/2755 |
| 2005/0203900 A1* | 9/2005 | Nakamura | G06F 17/30675 |
| 2006/0015317 A1* | 1/2006 | Nakagawa | G06F 17/2755 704/1 |
| 2007/0067156 A1* | 3/2007 | Park | G06F 17/2223 704/9 |
| 2007/0150260 A1* | 6/2007 | Lee | G06F 17/2818 704/2 |
| 2007/0219776 A1* | 9/2007 | Gamon | G06F 17/27 704/9 |
| 2008/0195940 A1* | 8/2008 | Gail | G06F 17/273 715/257 |
| 2008/0288243 A1* | 11/2008 | Kobayashi | G06F 17/2755 704/9 |
| 2009/0177460 A1* | 7/2009 | Huang | G06F 17/2818 704/2 |
| 2009/0249197 A1* | 10/2009 | Nagase | G06F 17/273 715/260 |
| 2009/0254501 A1* | 10/2009 | Song | G06F 17/2294 706/12 |
| 2009/0326913 A1* | 12/2009 | Simard | G06F 17/2836 704/2 |
| 2010/0070261 A1* | 3/2010 | Jin | G06F 17/2755 704/2 |
| 2010/0076764 A1* | 3/2010 | Chengalvarayan | G10L 15/26 704/251 |
| 2010/0174528 A1* | 7/2010 | Oya | G06F 17/2735 704/10 |
| 2012/0041756 A1* | 2/2012 | Hanazawa | G10L 15/02 704/9 |
| 2012/0117082 A1* | 5/2012 | Koperda | G06F 17/30657 707/748 |
| 2012/0323564 A1* | 12/2012 | Fujii | G11B 27/105 704/9 |
| 2012/0330648 A1* | 12/2012 | Boguraev | G06F 17/2735 704/9 |
| 2013/0103390 A1* | 4/2013 | Fujita | G06F 17/2765 704/9 |
| 2013/0103493 A1* | 4/2013 | Gao | G06Q 10/10 705/14.46 |
| 2013/0173258 A1* | 7/2013 | Liu | G06F 17/2217 704/9 |
| 2013/0191739 A1* | 7/2013 | Bank | G06F 17/2276 715/259 |
| 2013/0246047 A1* | 9/2013 | Vassilieva | G06F 17/278 704/9 |
| 2013/0246048 A1* | 9/2013 | Nagase | G06F 17/2223 704/9 |
| 2015/0058007 A1* | 2/2015 | Kim | G06F 17/24 704/235 |
| 2016/0019204 A1* | 1/2016 | Fuchs | G06F 17/30318 704/9 |

FOREIGN PATENT DOCUMENTS

| | | |
|---|---|---|
| CN | 101707873 | 5/2010 |
| JP | 2010-165041 | 7/2010 |
| JP | 2010-257021 | 11/2010 |
| KR | 10-2009-0061158 | 6/2009 |
| KR | 10-2010-0015518 | 2/2010 |
| KR | 10-2011-0018140 | 2/2011 |
| KR | 10-2011-0061209 | 6/2011 |

\* cited by examiner

FIG. 9

DEVICE FOR GENERATING ALIGNED CORPUS BASED ON UNSUPERVISED-LEARNING ALIGNMENT, METHOD THEREOF, DEVICE FOR ANALYZING DESTRUCTIVE EXPRESSION MORPHEME USING ALIGNED CORPUS, AND METHOD FOR ANALYZING MORPHEME THEREOF

BACKGROUND OF THE INVENTION (a) Field of the Invention

The present invention relates to a device for generating an aligned corpus based on unsupervised-learning alignment, and a method thereof, a device for analyzing a destructive expression morpheme using an aligned corpus, and a method for analyzing a morpheme thereof.

(b) Description of the Related Art

Recently, blogs, particularly social networking services represented by Facebook and Twitter, and mobile message services such as Kakaotalk, have been used daily for smartphones as well as computers, and their uses are increasing day by day.

However, when these messages are used, a huge amount of destructive expressions that are incorrect in terms of orthography are circulated. Here, the destructive expressions represent expressions of which orthography is wrong or which are not normalized or standardized, and a sentence including such a destructive expression is referred to as a destructive sentence. The destructive sentence represents a new language use paradigm generated by activation of the Internet and propagation of smartphones.

The destructive sentence includes a destructive expression, not a normal expression, but causes no inconvenience in carrying a meaning of the sentence.

A morpheme analysis used in natural language information processing such as a machine translation, retrieval, or data mining targets normal sentences without the destructive expression. That is, the existing morpheme analysis uses a morpheme dictionary storing morpheme knowledge or morpheme information to be used for a morpheme analysis, it is impossible to contain destroyed morphemes included in the above-noted destructive sentence into a normal morpheme dictionary because of their characteristics, and it is limited to add simply destroyed morphemes to the morpheme dictionary so it is difficult to analyze the morphemes in the destructive sentence including destructive expressions, which is a problem.

SUMMARY OF THE INVENTION

The present invention has been made in an effort to provide a device for generating an aligned corpus based on unsupervised-learning alignment for accurately morpheme-analyzing a destructive sentence including a destructive expression, a method thereof, a device for analyzing a destructive expression morpheme using an aligned corpus, and a method for analyzing a morpheme thereof.

An exemplary embodiment of the present invention provides a method for generating an aligned corpus, including: building a parallel corpus storing pairs of a destructive sentence including a destructive expression (here, the destructive expression represents an expression that is erroneous in orthography or is not normalized and standardized) and a normal sentence corresponding to the destructive sentence; and performing an unsupervised-learning-based alignment on the parallel corpus to generate an aligned corpus aligned with the destructive expression and the normal expression corresponding to the destructive expression.

The building of a parallel corpus includes: collecting a plurality of destructive sentences through a network; performing retrieval through the network with the destructive expression included in the collected destructive sentence as a query to determine universality on the corresponding destructive sentence; generating a normal sentence corresponding to the corresponding destructive sentence when the collected destructive sentence is determined to have universality; and forming the generated normal sentence and the corresponding destructive sentence into one pair to build the parallel corpus.

In the determining of universality, the corresponding destructive expression is determined to have universality when it exceeds a reference amount with respect to the amount of a result of the retrieval according to the query, and the determining of universality is automatically performed through web retrieval through a plurality of portal sites.

The generating of an aligned corpus includes: setting a sub-string pair in a random manner or according to an initialization methodology from a given string of the parallel corpus and initializing a relevance probability; performing a match between the destructive expression and the normal expressions so that a gap between the destructive sentence and the normal sentence may be optimized according to matching of strings and a corresponding match probability value; recalculating a probability between respective sub-string pairs according to a new alignment; and repeating the performing of a match and the calculating until a stop condition of an unsupervised-learning is satisfied, and when the stop condition is satisfied, storing a destructive expression, a normal expression, and a correlation probability (here, the correlation probability is an alignment probability value of the destructive expression and the normal expression) of a final output in the aligned corpus.

An expectation-maximization (EM) algorithm is performed so as to find an alignment based on an unsupervised-learning performed to generate the aligned corpus, and set a probability value of the alignment.

Another embodiment of the present invention provides a device for generating an aligned corpus, including: a parallel corpus builder for building a parallel corpus storing pairs of a destructive sentence including a destructive expression (here, the destructive expression is erroneous in orthography or is not normalized and standardized) and a normal sentence corresponding to the destructive sentence; and an unsupervised learner for generating an aligned corpus aligned with the destructive expression and the normal expression corresponding to the destructive expression by performing an unsupervised-learning-based alignment on the parallel corpus built by the parallel corpus builder.

The unsupervised learner includes: a parallel corpus built by the parallel corpus builder; and an unsupervised-learning aligner for generating the aligned corpus by learning an optimal alignment probability value among a single syllable, multiple syllables, or words of the destructive expression and the normal expression by use of an unsupervised-learning method to the parallel corpus.

The parallel corpus builder includes: a destructive sentence collector for collecting a plurality of destructive sentence through a network; a universality determiner for performing retrieval through the network with the destructive expression included in the destructive sentence collected by the destructive sentence collector as a query to determine universality on the corresponding destructive sentence; a normal sentence generator for generating a normal sentence corresponding to the corresponding destructive sentence when the collected destructive sentence is determined to have universality; and a building unit for forming the normal sentence generated by the normal sentence generator and the corresponding destructive sentence into one pair to build the parallel corpus.

The unsupervised-learning aligner includes: an initializer for setting a sub-string pair in a random manner or according to an initialization methodology from a given string of the parallel corpus and initializing a relevance probability; an E-step processor for performing a match between the destructive expression and the normal expressions so that a gap between the destructive sentence and the normal sentence may be optimized according to matching of strings and a corresponding match probability value; an M-step processor for recalculating a probability between respective sub-string pairs according to a new alignment; and a controller for inputting a string of the destructive sentence and the normal sentence built in the parallel corpus to the initializer, controlling repetition of the E-step processor and the M-step processor until a stop condition of unsupervised-learning is satisfied after a calculation of probability by the M-step processor, and when the stop condition is satisfied, generating the aligned corpus storing a destructive expression, a normal expression, and a correlation probability of a final output.

Another embodiment of the present invention provides a device for analyzing a morpheme, including: a knowledge database including an aligned corpus for storing a plurality of knowledge information sets used for a per-language morpheme analysis, and storing a morpheme dictionary for storing morpheme information corresponding to a normal expression and normal expression information corresponding to a destructive expression (here, the destructive expression represents an expression that is erroneous in orthography or is not normalized and standardized); and an analyzer for performing a morpheme analysis on an input separate word by use of the knowledge database and outputting an analysis result, and when a morpheme on the input separate word is not provided in the morpheme dictionary, finding a normal expression corresponding to the destructive expression by use of the aligned corpus regarding the destructive expression included in the input separate word and performing a morpheme analysis.

The knowledge database further includes an analyzed dictionary for storing per-morpheme access information, and the analyzer includes: a morpheme divider for dividing the morphemes forming the input separate word by use of the morpheme dictionary, and when the morpheme forming the input separate word is not provided in the morpheme dictionary, performing a morpheme division by using a corresponding normal expression by use of the aligned corpus; an access information checker for extracting morphemes that may be combined with the morphemes divided by the morpheme divider by use of the analyzed dictionary; and an original form restoring unit for performing an original form restoration on the morphemes extracted by the access information checker and outputting it as a morpheme analysis result.

The morpheme divider includes: a candidate group generator for dividing the input separate word into morphemes to generate morpheme candidates; a normal expression checking unit for checking whether a corresponding morpheme candidate exists regarding the morpheme candidate generated by the candidate group generator by use of the morpheme dictionary; a destructive expression checking unit for checking whether a destructive expression of the input separate word exists regarding the corresponding morpheme candidate by use of the aligned corpus when the morpheme candidate is determined to not exist in the morpheme dictionary by the normal expression checking unit; a dividing processor for morpheme-dividing the corresponding morpheme candidate from the input separate word when it is determined by the normal expression checking unit that the morpheme candidate exists in the morpheme dictionary; and a controller for controlling the candidate group generator, the normal expression checking unit, the destructive expression checking unit, and the dividing processor to perform a morpheme division on the input separate word, and when the morpheme candidate generated by the candidate group generator is determined to not exist in the morpheme dictionary by the normal expression checking unit, finding a corresponding normal expression through the destructive expression checking unit and re-inputting it to the candidate group generator.

The aligned corpus is generated by performing an unsupervised-learning-based alignment on the parallel corpus storing pairs of the destructive sentence including the destructive expression and the normal sentence corresponding to the destructive sentence and aligning as the destructive expression and the normal expression corresponding to the destructive expression.

The aligned corpus includes a correlation probability that is an alignment probability value between the destructive expression and the normal expression corresponding to the destructive expression.

In the case of a morpheme analysis, when it is determined whether the morpheme exists through the morpheme dictionary, each corresponding string is digitized and expressed as a probability that the same may be a morpheme by using the correlation probability.

The aligned corpus is generated based on an expectation-maximization (EM) algorithm.

Another embodiment of the present invention provides a method for analyzing a morpheme, including: dividing an input separate word into a morpheme and generating a morpheme candidate; determining whether the morpheme candidate exists in a morpheme dictionary (here, the morpheme dictionary represents a dictionary for storing morpheme information corresponding to a normal expression); when the morpheme candidate exists in the morpheme dictionary, performing a corresponding morpheme analysis; when the morpheme candidate does not exist in the morpheme dictionary, determining whether a destructive expression (here, the destructive expression represents an expression that is erroneous in orthography or is not normalized and standardized) included in the input separate word exists in an aligned corpus (here, the aligned corpus represents a corpus for storing normal expression information corresponding to the destructive expression); and when the destructive expression exists in the aligned corpus, finding a normal expression corresponding to the corresponding destructive expression and performing a morpheme analysis.

The performing of a morpheme analysis includes: extracting a morpheme that may be combined with the morpheme by use of an analyzed dictionary for storing per-morpheme access information; and performing an original form restoration on the extracted morpheme to output it as a morpheme analysis result.

The method further includes, before the determining whether the morpheme candidate exists in the morpheme dictionary, generating the aligned corpus.

The generating of the aligned corpus includes: building a parallel corpus storing pairs of a destructive sentence including a destructive expression and a normal sentence corresponding to the destructive sentence; and performing an unsupervised-learning-based alignment on the parallel corpus to generate an aligned corpus aligned with a destructive expression and a normal expression corresponding to the destructive expression.

According to the present invention, the destructive sentence including a destructive expression may be accurately morpheme-analyzed.

Further, the alignment information on the destructive expression and the normal expression is used as a supplementary morpheme dictionary so the general morpheme analyzer has the effect of enabling the function of exchanging into normal expressions as well as analyzing the destructive sentence morpheme.

Further, actions to various kinds of destructions are enabled by digitizing various relationships between the destructive expression and the normal expression according to the alignment through alignment information of the destructive expression and the normal expression and the unsupervised-learning.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er," "-or", and "module" described in the specification mean units for processing at least one function and operation, and can be implemented by hardware components or software components and combinations thereof.

First, a general morpheme analyzing device will be described.

Figure 1:
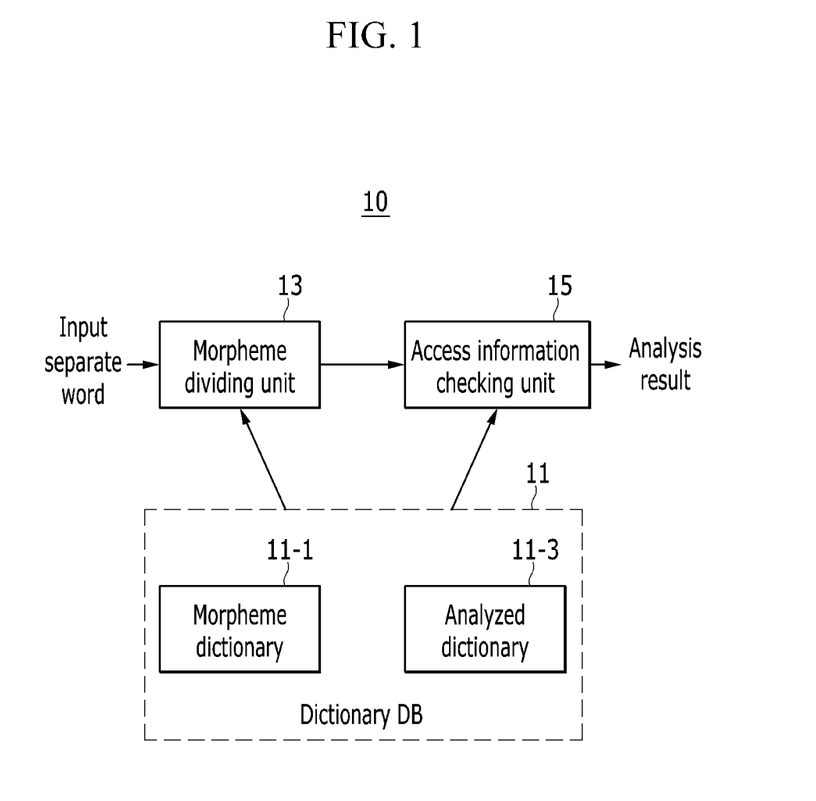
FIG. 1 shows a brief block diagram for showing a general morpheme analyzing device.

FIG. 1 shows a brief block diagram for showing a general morpheme analyzing device.

Referring to FIG. 1, in the general morpheme analyzing device 10, a morpheme dividing unit 13 refers to a morpheme dictionary 11-1 of a dictionary DB 11 to divide all available morphemes forming an input separate word, and an access information checking unit 15 refers to an analyzed dictionary 11-3 of the dictionary DB 11 to extract morphemes that may be combined from the morphemes divided by the morpheme dividing unit 13 and output them as a final morpheme analysis result.

Figure 2:
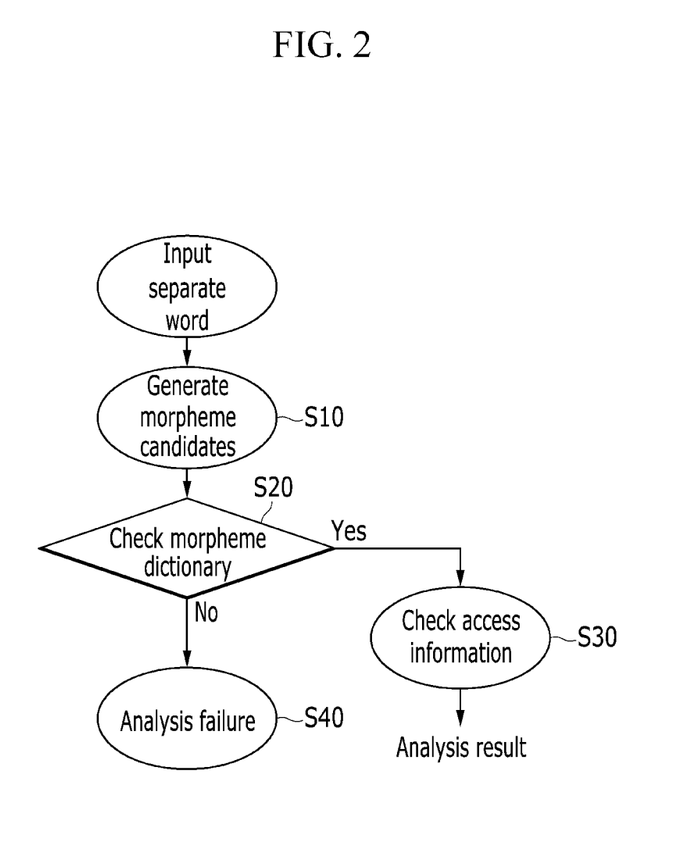
FIG. 2 shows a flowchart of a general morpheme analyzing method.

FIG. 2 shows a flowchart of a general morpheme analyzing method.

Referring to FIG. 2, the morpheme dividing unit 13 divides an input separate word into morphemes to generate morpheme candidates (S10), checks the morpheme dictionary 11-1 for the generated morpheme candidates (S20), and when they are found in the morpheme dictionary 11-1, the access information checking unit 15 checks access information to output a final analysis result (S30).

When the morpheme candidate is not found in the morpheme dictionary 11-1 in the step S20, it is recognized to be a word (Out-of dictionary word or Out-of-Vocabulary (OOV)) that is not registered to the morpheme dictionary 11-1 or it is recognized to be an invalid morpheme, and it is processed to be a morpheme analysis failure (S40).

The destructive expressions that are targets in an exemplary embodiment of the present invention may be recognized to be words that are not registered to the general morpheme analyzing device 10 or invalid morphemes.

The destructive expression that is a target in an exemplary embodiment of the present invention will now be described.

A large amount of expressions destroying the Korean language including typographical errors are circulated when Korean messages are used, and netizens, particularly primary schoolchildren, newly make "alien words" and circulate them every day so the phenomenon of destruction of Hangul is reaching the level where linguists may have concern.

Destructive patterns of the above-noted Korean language destructive sentences will now be described.

1 Orthographic Errors

Many destructive sentences include typographical errors. The typographical errors indicate errors that are made when an accurate spelling is not known or the accurate spelling is ignored. For example, there are destructive expressions such as expressing '만났다' as '만나따', '싫어졌다' as '시퍼져따', '있어' as '잇서', and '됐어' as '돼써'. These kinds of errors show a feature that they are written according to speech, and since they are written according to speech, they are sometimes used as means to express new nuances.

Other kinds of typographical errors are errors that are caused by mistyping. Particularly, mistyping is frequently generated while a user inputs characters to a relatively small screen such as a smartphone while he travels. Such errors show a characteristic in which keys that are close to the keys that must be typed are input. For example, '남자친구' is mistakenly input as '남자 턴구', which is a case in which 'ㅊ' is mistyped with 'ㅌ' and '나이' is input as '나이' which is a case in which 'ㅏ' is mistyped with 'ㅣ'. Particularly, 'ㅈ' and 'ㄷ' 'ㅌ' and 'ㅊ', 'ㅏ' and 'ㅕ', and 'ㅠ' and 'ㅜ' have a high probability that they may be input as mistypes with each other.

2 Neologisms

One kind of neologism is new abbreviations. For example, '근자감' is an abbreviation of '근거 없는 자신감', '고터' is an abbreviation of '고속터미널', '버카' is an abbre-viation of '버스 카드', '여병추' is an abbreviation of '여기 병신 추가' and '깜놀' is an abbreviation of '깜짝 놀라다', which are used in common among the netizens.

Another kind of neologism is to add 'ㅇ' such as from '죠' to '죵' which is used to carry a cuter or prettier feeling.

Although not included in the two kinds, another problem that challenges the existing natural language processing system based on the normal sentence is common use of many versions of transliterations of foreign languages. For example, the usage is such as 스타일리시<=>스타일리시 and 콩구레츄레이션<=>콩그레츄레이션.

A difference of pronunciation between the foreign languages and the Korean language makes one-to-one transliterations difficult to thus cause various transliteration versions, and it is difficult to set a transliteration standard in this situation, and even when the standard is set, it may be highly probable that the standard is not observed.

As described, when the destructive sentences including the destructive expression are morpheme-analyzed through the general morpheme analyzing device 10, they are not provided in the morpheme dictionary 11-1 to not perform a morpheme analysis so the existing natural language processing skill or the machine translation may not be freely performed.

An exemplary embodiment of the present invention for solving the above-described problem will now be described.

Figure 3:
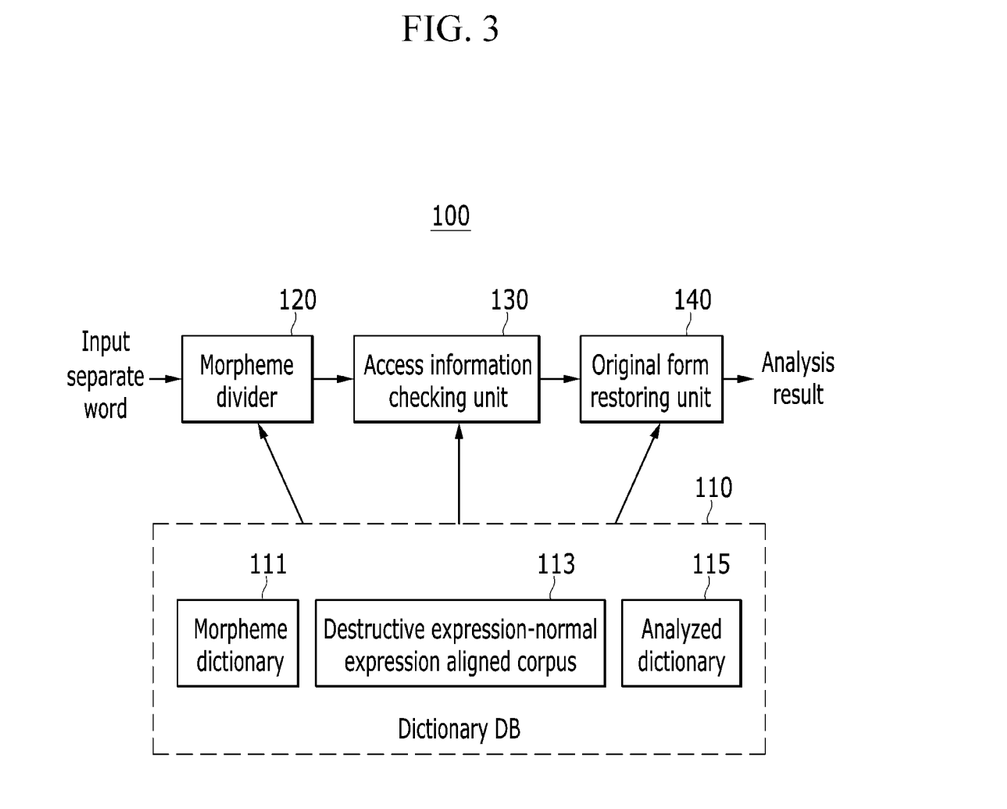
FIG. 3 shows a configurational block diagram of a device for analyzing a morpheme according to an exemplary embodiment of the present invention.

FIG. 3 shows a configurational block diagram of a device for analyzing a morpheme according to an exemplary embodiment of the present invention.

As shown in FIG. 3, a morpheme analyzing device 100 according to an exemplary embodiment of the present invention includes a dictionary database (DB) 110, a morpheme divider 120, an access information checking unit 130, and an original form restoring unit 140.

The dictionary DB 110 stores various dictionary information used in a morpheme analysis on an input separate word. The dictionary DB 110 includes a morpheme dictionary 111 used for a morpheme analysis, a destructive expression-normal expression aligned corpus 113 storing a destructive expression, a normal expression corresponding to the same, and a correlation probability that is a numerical value of a relevance between the destructive expression and the normal expression, and used in a morpheme analysis, and an analyzed dictionary 115 used to check access information and restore an original form. In addition, various forms of dictionary information used for the morpheme analysis for respective languages may be stored. Here, the destructive expression-normal expression aligned corpus 113 is generated by building a parallel corpus including a destructive sentence including a destructive expression and a corresponding normal sentence, and performing an unsupervised-learning on an optimal alignment of the destructive expression and the normal expression in each sentence of the built parallel corpus. This will be described in detail in a latter part of the specification. The meanings of the corpus and the morpheme analysis used in the language processing are well known to a skilled person in the art so no detailed description thereof will be provided.

The morpheme divider 120 divides all available morphemes forming an input separate word by referring to the morpheme dictionary 111 and the destructive expression-normal expression aligned corpus 113 of the dictionary DB 110. In this instance, when the morpheme divided from the input separate word is found not in the morpheme dictionary 111 but in the destructive expression-normal expression aligned corpus 113, the morpheme divider 120 uses a normal expression corresponding to the corresponding morpheme to divide the morphemes.

The access information checker 130 refers to the analyzed dictionary 115 of the dictionary DB 110 to extract morphemes that may be combined to the morphemes divided by the morpheme dividing unit 120.

The original form restoring unit 140 perform original form restoration on the morphemes extracted by the access information checking unit 130 to output as a morpheme analysis result.

Figure 4:
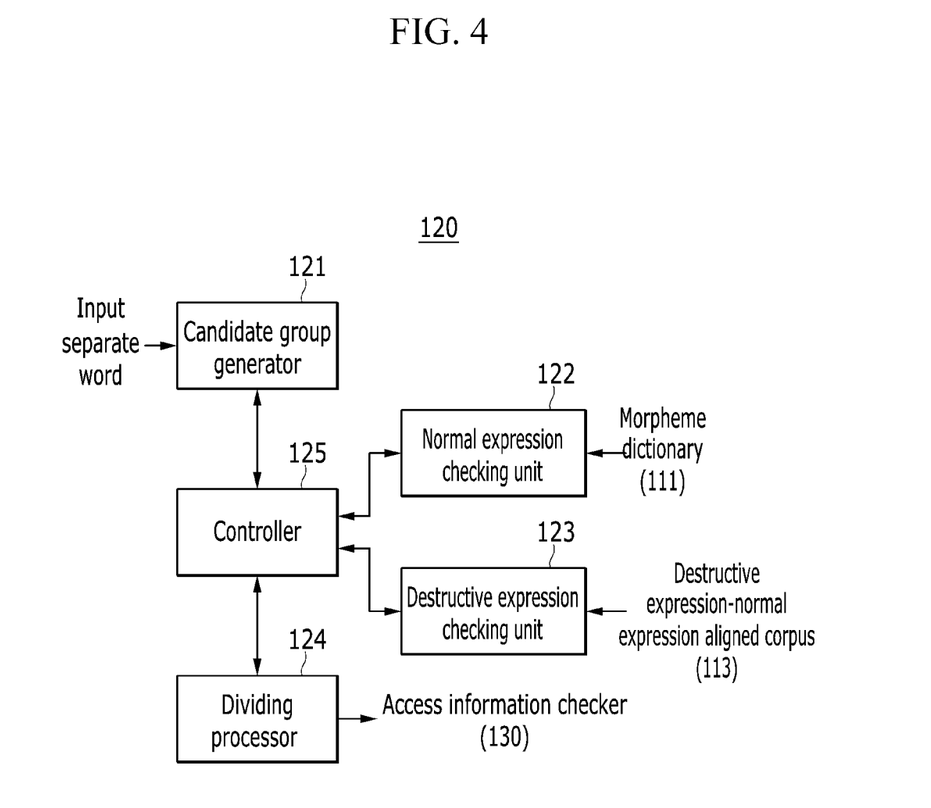
FIG. 4 shows a detailed configurational block diagram morpheme divider shown in FIG. 3.

FIG. 4 shows a detailed configurational block diagram morpheme divider 120 shown in FIG. 3.

As shown in FIG. 4, the morpheme divider 120 includes a candidate group generator 121, a normal expression checking unit 122, a destructive expression checking unit 123, a dividing processor 124, and a controller 125.

The candidate group generator 121 divides an input separate word into morphemes to generate morpheme candidates.

The normal expression checking unit 122 refers to the morpheme dictionary 111 for the morpheme candidate generated by the candidate group generator 121 and checks whether a corresponding morpheme candidate exists.

When it is determined by the normal expression checking unit 122 that the morpheme candidate does not exist in the morpheme dictionary 111, the destructive expression checking unit 123 refers to the destructive expression-normal expression aligned corpus 113 for the destructive expression of the input separate word to check whether a normal expression corresponding to the corresponding destructive expression exists.

When it is determined by the normal expression checking unit 122 that the morpheme candidate exists in the morpheme dictionary 111, the dividing processor 124 morpheme-divides the corresponding morpheme candidate from the input separate word.

The controller 125 controls the candidate group generator 121, the normal expression checking unit 122, the destructive expression checking unit 123, and the dividing processor 124 to divide the input separate word into morphemes, and transmits finally divided morphemes to the access information checker 130. Particularly, when it is checked by the destructive expression checking unit 123 that the normal expression corresponding to the destructive expression exists, the controller 125 uses the corresponding normal expression to perform a control so that the candidate group generator 121 again generates a morpheme candidate and the normal expression checking unit 122 may check whether a morpheme candidate exists regarding the generated morpheme candidates.

A content for generating a destructive expression-normal expression aligned corpus 113 shown in FIG. 3 will now be described.

Figure 5:
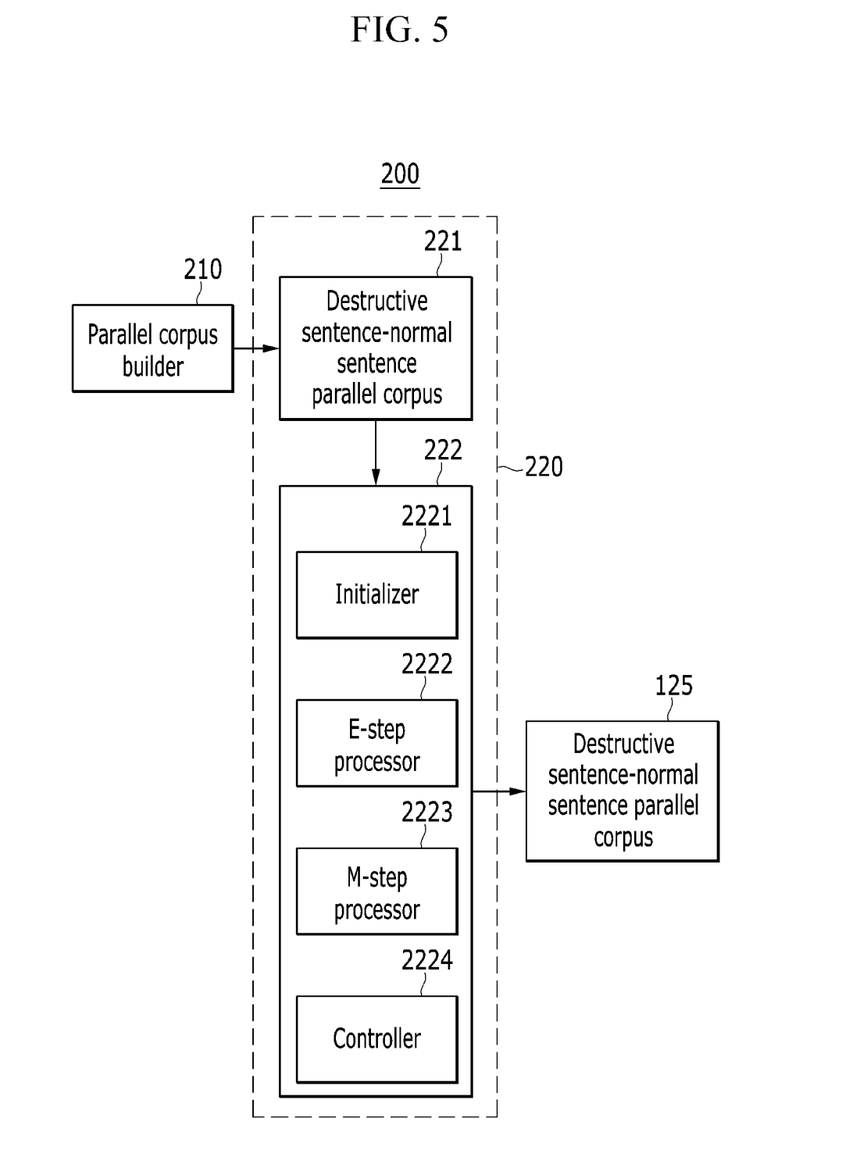
FIG. 5 shows a configurational block diagram of a device for generating a destructive expression-normal expression aligned corpus shown in FIG. 3.

FIG. 5 shows a configurational block diagram of a device 200 for generating a destructive expression-normal expression aligned corpus 113 shown in FIG. 3.

As shown in FIG. 5, the device 200 for generating a destructive expression-normal expression aligned corpus 113 includes a parallel corpus builder 210 and an unsupervised learner 220.

The parallel corpus builder 210 builds a destructive sentence-normal sentence parallel corpus 221 for collecting a destructive sentence including a commonly used destructive expression, generating a normal sentence corresponding to the destructive sentence, and storing pairs of the destructive sentence and the normal sentence.

The unsupervised learner 220 includes the destructive sentence-normal sentence parallel corpus 221 built by the parallel corpus builder 210, and an unsupervised-learning aligner 222 for using an unsupervised machine learning method for the destructive sentence-normal sentence parallel corpus 221, learning an optimal alignment probability value among a single syllable, multiple syllables, or words of the destructive expression and the normal expression, and generating the destructive expression-normal expression aligned corpus 113.

The unsupervised-learning aligner 222 includes an initializer 2221, an expectation (E)-step processor 2222, a maximization (M)-step processor 2223, and a controller 2224.

The initializer 2221 sets a relevant sub-string pair from a string provided by the destructive sentence-normal sentence parallel corpus 221 in a random manner or according to another initialization methodology, and initializes a relevance probability.

The E-step processor 2222 performs decoding, and performs matching between the destructive expression and the normal expressions so that a match between the destructive sentence and the normal sentence may be optimized according to a match of strings and a corresponding match probability value.

The M-step processor 2223 performs a probability calculation, and recalculates a probability between respective sub-string pairs according to a new alignment.

The controller 2224 inputs the string of the destructive sentence and the normal sentence built in the destructive sentence-normal sentence parallel corpus 221 to the initializer 2221, controls an iteration of the E-step processor 2222 and the M-step processor 2223 until a stop condition of unsupervised-learning is satisfied after a calculation of probability by the M-step processor 2223, and stores, when the stop condition is satisfied, a string of a final output, that is, a result including the destructive expression, the normal expression, and the correlation probability in the destructive expression-normal expression aligned corpus 113.

E-step processing and M-step processing performed by the E-step processor 2222 and the M-step processor 2223, respectively, will be described in detail in a latter part of the specification.

A content for the parallel corpus builder 210 shown in FIG. 5 to build a destructive sentence-normal sentence parallel corpus 221 will now be described.

Figure 6:
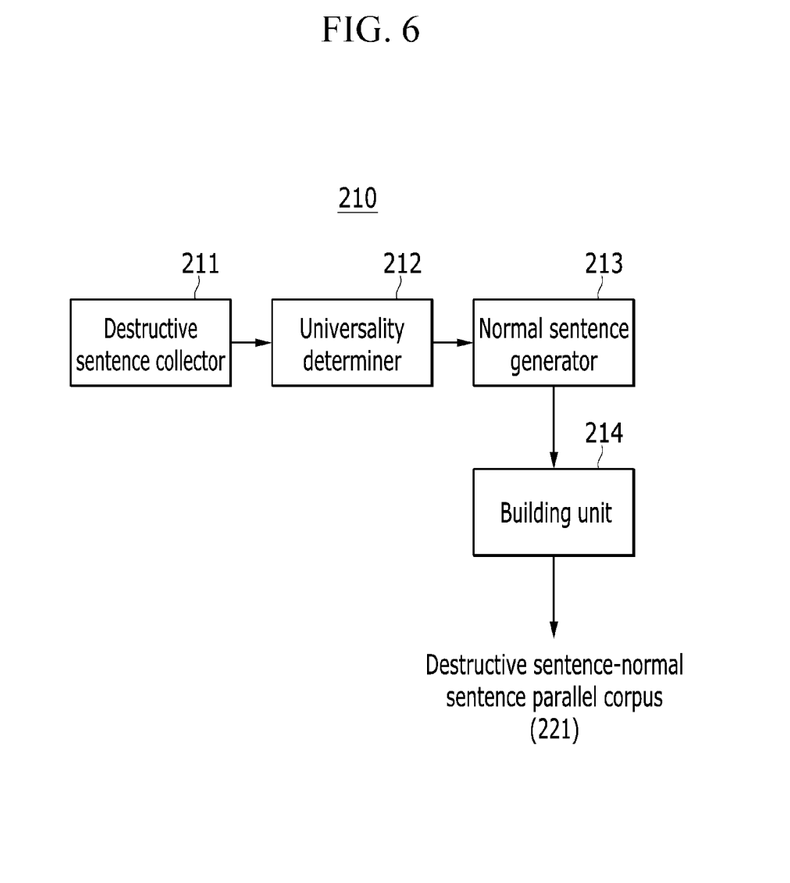
FIG. 6 shows a configurational block diagram of a parallel corpus builder shown in FIG. 5.

FIG. 6 shows a configurational block diagram of a parallel corpus builder 210 shown in FIG. 5.

As shown in FIG. 6, the parallel corpus builder 210 includes a destructive sentence collector 211, a universality determiner 212, a normal sentence generator 213, and a building unit 214.

The destructive sentence collector 211 collects a predetermined amount of destructive sentences through a mobile short message service (SMS), a Kakaotalk message, and Internet Twitter. As such destructive sentences, for example, 1,000,000 destructive sentences may be collected and used.

Further, the destructive sentences may be collected online or destructive sentences collected by a manager may be collected by an input through an input means.

The universality determiner 212 performs online retrieval with the destructive expression included in the destructive sentence collected by the destructive sentence collector 211 as a query, determines a universally used destructive expression state with reference to the amount of results according to the query, and determines universality of the corresponding destructive expression. Such determination of universality on the destructive expression may be automatically performed through web retrieval such as Naver, Daum, or Google.

The normal sentence generator 213 generates a normal expression corresponding to the destructive expression that is determined to have universality by the universality determiner 212. Such generation of a normal expression may be automatically performed through web retrieval or may be performed directly by the manager.

The building unit 214 forms the normal sentence generated by the normal sentence generator 213 as one pair with the corresponding destructive sentence to build the same in the destructive sentence-normal sentence parallel corpus 221.

A method for an unsupervised-learning aligner 222 shown in FIG. 5 to perform an unsupervised-learning alignment on the destructive sentence-normal sentence parallel corpus 221 and generate a destructive expression-normal expression aligned corpus 113 will now be described in detail.

First, an alignment of a destructive sentence and a normal sentence according to an exemplary embodiment of the present invention uses a method for finding an alignment that is performed in an unsupervised manner according to an unsupervised machine learning method and has a greatest value of the entire corpus, and setting a probability value of the alignment. In this instance, an expectation-maximization (EM) algorithm is used as the method for finding an optimized alignment and setting a probability value of the alignment in an exemplary embodiment of the present invention, which may also be performed by using other methods that are unsupervised and supervised.

In an exemplary embodiment of the present invention, it is assumed that $U_j^i$ indicates a string of $u_i, u_{i+1}, \ldots, u_j$, and $V_l^m$ indicates $v_i, v_{i+1}, \ldots, v_m$.

To perform an alignment operation by use of the EM algorithm, a decoding step (E-step) for finding an optimized normal expression string with a destructive expression and a step (M-step) for learning a probability between the respective strings are needed. This process is performed with three steps as below.

1) An Initialization Step (Step 1)

In the given destructive string, a relevant sub-string pair is set in a random manner or according to another initialization methodology, and a relevance probability value is initialized to be 0. That is, it is set as an alignment probability value $P(V_{j-k}^m | U_{i-h}^n) = O$ of a random destructive string $U_{i-h}^n$ and a normal string $V_{j-k}^m$.

2) An Expectation Step (Step 2)

This step is to find pairs of the destructive string and the normal string from the input destructive sentence and normal sentence.

In this step, respectively corresponding sub-string pairs are found from the string pair of $U_1^n = u_1, u_2, \ldots, u_n$ and $V_1^m = v_1, v_2, \ldots v_m$ given according to a dynamic programming decoding method according to the present probability value.

A detailed decoding process is as below.

Regarding the destructive expression string $U_1^n$ and the normal expression string $V_1^m$, $S(i,j)$ signifies an alignment score up to the destructive expression string $U_1^i$ and the normal expression string $V_1^m$. In this case, a process for finding the corresponding sub-string pair of the destructive expression $U_1^n$ and the normal expression $V_1^m$ is performed by subsequent steps 1 to 3 given below.

<Subsequent Step 1>

$$S(O,O)=O$$

As an initialization stage, a value of $S(O, O)$ including no string is set to be 0.

<Subsequent Step 2>

$$S(i,j)=\max_{h,k}[S(i-h,j-k)+\log P(V_{j-k}^m|U_{i-h}^n)],$$
$$o \Box i \Box n, o \Box j \Box m$$

The alignment score $S(i,j)$ up to the destructive expression string $U_1^i$ and the normal expression string $V_1^j$ is a maximum value (max) of a sum of an alignment score $S(i-h,j-k)$ up to the destructive expression string $U_1^{i-h}$ and the normal expression string $V_1^{j-k}$ and an alignment weight value $\log P(V_{j-k}^i|U_{i-h}^i)$ up to the destructive expression string $U_{i-h}^i$ and the normal expression string $V_{j-k}^j$.

Here, $\log P(V_{j-k}^i|U_{i-h}^i)$ is a logarithmic (log) value of the alignment probability $P(V_{j-k}^i|U_{i-h}^i)$ of $V_{j-k}^j$ and $U_{i-h}^i$, and $P(V_{j-k}^i|U_{i-h}^i)$ is a value calculated in step 1 of the EM algorithm and a step 3 to be described.

<Subsequent Step 3>

The alignment score $S(n,m)$ sequentially calculated on the destructive expression string from 1 to n and on the normal expression string from 1 to m according to above-noted Subsequent step 2 represents a highest alignment value up to the destructive expression string $U_1^i$ and the normal expression string $V_1^j$.

3) A Maximization Step (Step 3)

This step is a stage for finding a probability value caused by the statistics of the pair of the destructive expression string and the normal expression string aligned in step 2, it is a method for back-tracking the respective sub-string pairs aligned to be a maximum value, and it finds the normal expression string corresponding to the destructive expression string.

In detail, it counts the respective sub-string pairs of the stages of step 2 to estimate the probability value of the strings that correspond at the present time according to $$P(V_1^j | U_1^i) = \frac{\text{count}(U_1^i, V_1^j)}{\text{count}(U_1^i)}.$$

Here, the count $(U_1^i, V_1^j)$ indicates a number of times that $U_1^i$ and $V_1^j$ appear together in the entire parallel corpus, and the count $(U_1^i)$ indicates a number of times that $U_1^i$ appears in the entire parallel corpus.

After the above-noted step 3, when a termination condition is not satisfied, the above-noted step 2 and step 3 are repeated until the termination condition is satisfied. The repetitions at this time are performed when the result value of the previous step 3 is reflected.

When the termination condition is satisfied and the alignment of the destructive expression and the normal expression is finished, the corresponding destructive expression and the normal expression and a correlation probability between them are stored in the expression-normal expression aligned corpus 113.

For example, when the destructive sentence written in the destructive sentence-normal sentence parallel corpus 221 is "It will be 4ever" and the corresponding written normal sentence is "it will be forever", "4ever::forever::0.5947", "4::for::0.1201", "데 :: 디 ::0.3210", etc., may be generated and stored in the destructive expression-normal expression aligned corpus 113 according to the above-described process. In this instance, a form written in the destructive expression-normal expression aligned corpus 113 is a "destructive expression::normal expression::correlation probability". Here, the correlation probability may correspond to the alignment probability value of the destructive expression and the normal expression found in the above-noted step 1 and step 3.

A method for analyzing a morpheme according to an exemplary embodiment of the present invention will now be described with reference to FIG. 7.

Figure 7:
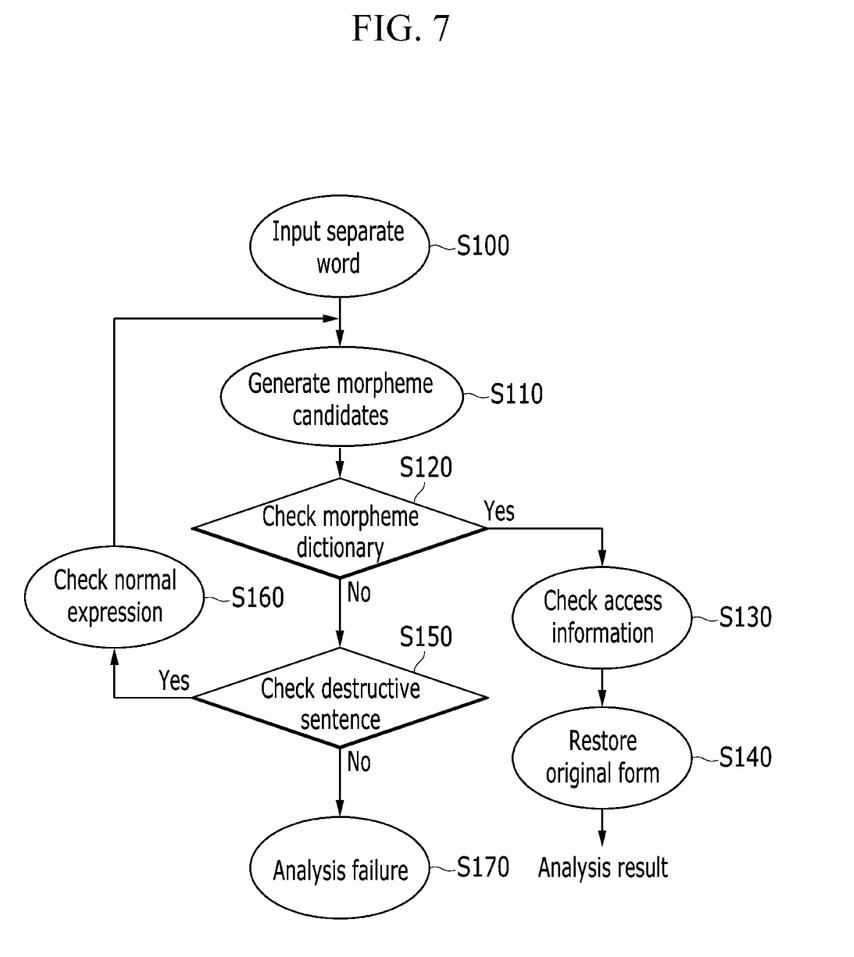
FIG. 7 shows a flowchart of a method for analyzing a morpheme according to an exemplary embodiment of the present invention.

FIG. 7 shows a flowchart of a method for analyzing a morpheme according to an exemplary embodiment of the present invention.

Before the description thereof, a state in which, after the destructive sentence-normal sentence parallel corpus 221 is built by the parallel corpus builder 210 of the device 200, the unsupervised learner 220 performs an unsupervised-learning-based optimal alignment on the built destructive sentence-normal sentence parallel corpus 221 to generate the destructive expression-normal expression aligned corpus 113 in advance will be assumed.

Referring to FIG. 7, when a separate word for a morpheme analysis is input (S100), the morpheme divider 120 divides the input separate word into morphemes to generate morpheme candidates (S110).

After this, the morpheme divider 120 checks the morpheme dictionary 111 for the generated morpheme candidates (S120), and when it is found in the morpheme dictionary 111, the same transmits it to the access information checker 130 so that access information on the corresponding morpheme may be checked (S130).

As described, after the access information is checked, the original form restoring unit 140 performs an original form restoration on the corresponding morpheme (S140) to output a final analysis result.

However, at this time, when the input separate word corresponds to the destructive expression, the morpheme candidate is not in the morpheme dictionary 111 in the step S120, so the morpheme divider 120 checks the destructive expression-normal expression aligned corpus 113 for the corresponding morpheme candidate (S150).

When the destructive expression of the input separate word is provided in the destructive expression-normal expression aligned corpus 113 through the previous unsupervised-learning-based optimal alignment, the morpheme divider 120 checks the normal expression corresponding to the corresponding destructive expression (S160), and repeats on the checked normal expression starting from the step S110 for generating a morpheme candidate. In this instance, the morpheme candidates generated for the checked normal expression are already provided in the morpheme dictionary 111, so the corresponding morpheme is checked to exist in the step for checking the morpheme dictionary 111, the following steps S130 and S140 are performed, and the final analysis result may be output.

When the input separate word is not generated in the destructive expression-normal expression aligned corpus 113 through the destructive expression or the unsupervised-learning-based optimal alignment or it corresponds to a separate word of other errors, the corresponding separate word is not in the destructive expression-normal expression aligned corpus 113 in the step S150 so such the separate word is recognized to be a word (Out-of dictionary word or Out-of-Vocabulary (OOV)) not registered to the morpheme dictionary 111 or is recognized to be an invalid morpheme, and it is processed as a morpheme analysis failure (S170).

As described, when the destructive sentence including the destructive expressions is morpheme-analyzed in the existing morpheme analysis, it is determined to be OOV on the basis that the corresponding morpheme is not in the morpheme dictionary and the destructive expression is erroneously recognized, and in an exemplary embodiment of the present invention, regarding the destructive expressions, the normal expression corresponding to the destructive expression is built in a form of the destructive expression-normal expression aligned corpus 113 through the unsupervised-learning-based optimal alignment, so when these destructive expressions are not provided in the morpheme dictionary 111, destructive expression checking on the destructive expression-normal expression aligned corpus 113 is performed to find a corresponding normal expression and perform an accurate morpheme analysis.

In an exemplary embodiment of the present invention, for the restoration to the normal expression corresponding to the destructive expression, when the destructive expression-normal expression aligned corpus 113 is built, the optimal alignment of the destructive expression and the normal expression in the destructive sentence is learned in an unsupervised manner, it is found as a probability value and provided as a correlation probability on the destructive expression and the normal expression thereby digitizing the variety of destructive expressions. That is, at the time of morpheme analysis, when it is determined whether the morpheme exists through the morpheme dictionary 111, each string is digitized and expressed as a probability that it may be a morpheme. For example, the determination of whether there is a morpheme or there is no morpheme is expressed with a number of between 0 (does not exist) and 1 (exists) to provide numeric information for solving ambiguity in the case of morpheme analysis.

Figure 8:
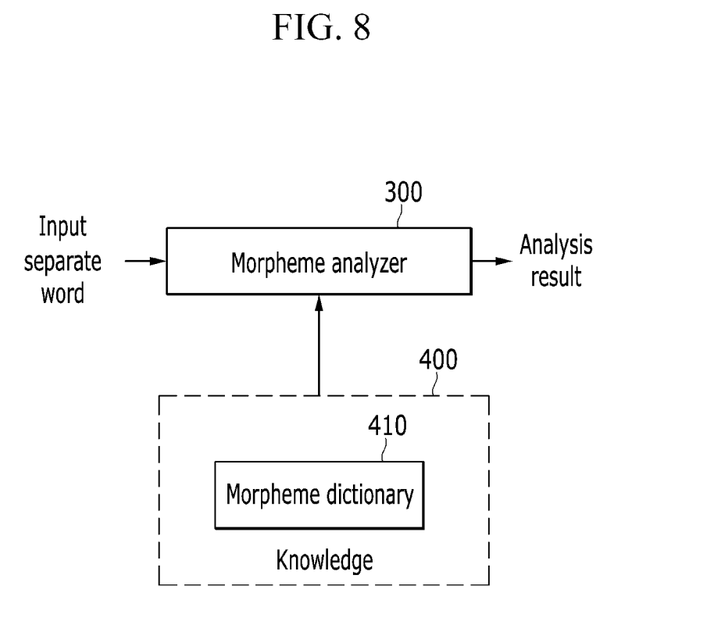
FIG. 8 shows a brief structure of a general-purpose device for analyzing a morpheme in common use in a plurality of languages.

The morpheme analysis on the Korean language has been described in the above, but the destructive expressions are frequently used in other languages such as English just like the Korean language, and the existing normal sentence based language processing methodology definitely has a restriction on processing the destructive sentence including destructive expressions. For example, as shown in attached FIG. 8, in the case of the general morpheme analyzing device, a morpheme analyzer 300 for performing a morpheme analysis refers to knowledge 400 to be referred to on the morpheme analysis to perform a morpheme analysis on the corresponding language. In this instance, the knowledge 400 to be referred to on the morpheme analysis exemplarily includes a morpheme dictionary.

Because of morphologic differences between one language and another language, a detailed analysis process and knowledge needed for each analysis process may be different from each other on the morpheme analysis for respective languages. For example, in the case of the Korean language, as shown in FIG. 1, it may be divided into constituent elements or processes such as morpheme division, access information checking, and original form restoration, and the reference knowledge 400 may be embodied in the morpheme dictionary 11-1.

Figure 9:
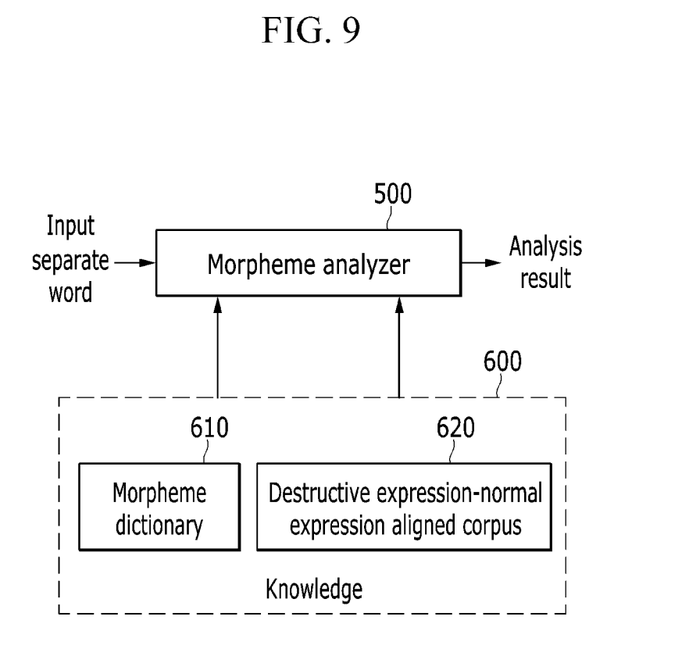
FIG. 9 shows an example in which a destructive expression-normal expression aligned corpus according to an exemplary embodiment of the present invention is applied to a device for analyzing a morpheme shown in FIG. 8.

Therefore, when the above-described contents are referred to and correspond to the Korean language regarding other languages such as English, as shown in FIG. 9, a parallel corpus on the destructive sentences and the normal sentences is built, and unsupervised-learning-based optimal alignment is performed on the built parallel corpus on the destructive sentences and the normal sentences to generate and apply a destructive expression-normal expression aligned corpus 620 so the morpheme analyzer 500 may check a destructive expression-normal expression aligned corpus 620 for the destructive expressions that are not found in the morpheme dictionary 610 to find normal expressions corresponding to the destructive expressions and perform a normal morpheme analysis.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for analyzing a morpheme in natural language information processing, comprising:

a knowledge database including an aligned corpus for storing a plurality of knowledge information sets used for a per-language morpheme analysis, and storing a morpheme dictionary for storing morpheme information corresponding to a normal expression and normal expression information corresponding to a destructive expression, wherein the destructive expression represents an expression that is erroneous in orthography or is not normalized and standardized, and includes an orthographic error; and an analyzer for, by a processor, performing a morpheme analysis on an input separate word by use of the knowledge database and outputting an analysis result, and when a morpheme on the input separate word is not provided in the morpheme dictionary, finding the normal expression corresponding to the destructive expression by use of the aligned corpus regarding the destructive expression included in the input separate word and performing a morpheme analysis, wherein the aligned corpus is generated by performing an unsupervised-learning-based alignment on a parallel corpus storing pairs of a destructive sentence including the destructive expression and a normal sentence corresponding to the destructive sentence, and wherein the parallel corpus is built by collecting a plurality of destructive sentences through a network, performing retrieval through the network with the destructive expression included in the collected destructive sentence as a query to determine universality on the corresponding destructive sentence, generating the normal sentence corresponding to the destructive sentence when the collected destructive sentence is determined to have universality, and forming the generated normal sentence and the corresponding destructive sentence into one pair to build the parallel corpus, wherein the knowledge database further includes an analyzed dictionary for storing per-morpheme access information, and the analyzer includes:

a morpheme divider for dividing the morphemes forming the input separate word by use of the morpheme dictionary, and when the morpheme forming the input separate word is not provided in the morpheme dictionary, performing a morpheme division by using the corresponding normal expression by use of the aligned corpus;

an access information checker for extracting morphemes that are capable of being combined with the morphemes divided by the morpheme divider by use of the analyzed dictionary; and an original form restoring unit for performing an original form restoration on the morphemes extracted by the access information checker and outputting it as a morpheme analysis result.

2. The device of claim 1, wherein the morpheme divider includes:

a candidate group generator for dividing the input separate word into morphemes to generate morpheme candidates;

a normal expression checking unit for checking whether a corresponding morpheme candidate exists regarding the morpheme candidate generated by the candidate group generator by use of the morpheme dictionary;

a destructive expression checking unit for checking whether the destructive expression of the input separate word exists regarding the corresponding morpheme candidate by use of the aligned corpus when the morpheme candidate is determined to not exist in the morpheme dictionary by the normal expression checking unit;

a dividing processor for morpheme-dividing the corresponding morpheme candidate from the input separate word when it is determined by the normal expression checking unit that the morpheme candidate exists in the morpheme dictionary; and a controller for controlling the candidate group generator, the normal expression checking unit, the destructive expression checking unit, and the dividing processor to perform a morpheme division on the input separate word, and when the morpheme candidate generated by the candidate group generator is determined to not exist in the morpheme dictionary by the normal expression checking unit, finding the corresponding normal expression through the destructive expression checking unit and re-inputting it to the candidate group generator.

3. The device of claim 1, wherein the aligned corpus includes a correlation probability that is an alignment probability value between the destructive expression and the normal expression corresponding to the destructive expression.

4. The device of claim 3, wherein in the case of a morpheme analysis, when it is determined whether the morpheme exists through the morpheme dictionary, each corresponding string is digitized and expressed as a probability that the same is a morpheme by using the correlation probability.

5. The device of claim 1, wherein the aligned corpus is generated based on an expectation-maximization (EM) algorithm.

6. The device of claim 1, further comprising an unsupervised-learning aligner for, by the processor, generating the aligned corpus by learning an optimal alignment probability value among a single syllable, multiple syllables, or words of the destructive expression and the normal expression by use of an unsupervised-learning method to the parallel corpus.

7. The device of claim 6, wherein the unsupervised-learning aligner includes:

an initializer for setting a sub-string pair in a random manner or according to an initialization methodology from a given string of the parallel corpus and initializing a relevance probability;

an E-step processor for performing a match between the destructive expression and the normal expressions so that a gap between the destructive sentence and the normal sentence is optimized according to matching of strings and a corresponding match probability value;

an M-step processor for recalculating a probability between respective sub-string pairs according to a new alignment; and a controller for inputting a string of the destructive sentence and the normal sentence built in the parallel corpus to the initializer, controlling repetition of the E-step processor and the M-step processor until a stop condition of unsupervised-learning is satisfied after a calculation of probability by the M-step processor, and when the stop condition is satisfied, generating the aligned corpus storing the destructive expression, the normal expression, and a correlation probability of a final output.

8. A method for analyzing a morpheme in natural language information processing by a processor by using a database storing a morpheme dictionary and an aligned corpus, comprising:

dividing an input separate word into a morpheme and generating a morpheme candidate;

determining whether the morpheme candidate exists in the morpheme dictionary, wherein the morpheme dictionary represents a dictionary for storing morpheme information corresponding to a normal expression;

when the morpheme candidate exists in the morpheme dictionary, performing a corresponding morpheme analysis;

when the morpheme candidate does not exist in the morpheme dictionary, determining whether a destructive expression included in the input separate word exists in the aligned corpus, wherein the destructive expression represents an expression that is erroneous in orthography or is not normalized and standardized, and includes an orthographic error, and wherein the aligned corpus represents a corpus for storing normal expression information corresponding to the destructive expression; and when the destructive expression exists in the aligned corpus, finding the normal expression corresponding to the destructive expression and performing a morpheme analysis, wherein the generating of the aligned corpus includes building a parallel corpus storing pairs of a destructive sentence including the destructive expression and a normal sentence corresponding to the destructive sentence, and performing an unsupervised-learning-based alignment on the parallel corpus to generate the aligned corpus aligned with the destructive expression and the normal expression corresponding to the destructive expression, and wherein the building of the parallel corpus includes collecting a plurality of destructive sentences through a network, performing retrieval through the network with the destructive expression included in the collected destructive sentence as a query to determine universality on the corresponding destructive sentence, generating the normal sentence corresponding to the destructive sentence when the collected destructive sentence is determined to have universality, and forming the generated normal sentence and the corresponding destructive sentence into one pair to build the parallel corpus, wherein the performing of a morpheme analysis includes:

performing a morpheme division by using the corresponding normal expression by use of the aligned corpus when the morpheme candidate is not provided in the morpheme dictionary;

extracting a morpheme that is capable of being combined with the morpheme by use of an analyzed dictionary for storing per-morpheme access information; and performing an original form restoration on the extracted morpheme to output it as a morpheme analysis result.

9. The method of claim 8, further comprising before the determining whether the morpheme candidate exists in the morpheme dictionary, generating the aligned corpus.

10. The method of claim 8, wherein in the determining of universality, the corresponding destructive expression is determined to have universality when it exceeds a reference amount with respect to the amount of a result of the retrieval according to the query, and the determining of universality is automatically performed through web retrieval through a plurality of portal sites.

11. The method of claim 8, wherein the generating of an aligned corpus further includes:

setting a sub-string pair in a random manner or according to an initialization methodology from a given string of the parallel corpus and initializing a relevance probability;

performing a match between the destructive expression and the normal expressions so that a gap between the destructive sentence and the normal sentence is optimized according to matching of strings and a corresponding match probability value;

recalculating a probability between respective sub-string pairs according to a new alignment; and repeating the performing of a match and the calculating until a stop condition of an unsupervised-learning is satisfied, and when the stop condition is satisfied, storing the destructive expression, a normal expression, and a correlation probability of a final output in the aligned corpus, wherein the correlation probability is an alignment probability value of the destructive expression and the normal expression.

12. The method of claim 8, wherein an expectation-maximization (EM) algorithm is performed so as to find the unsupervised-learning-based alignment performed to generate the aligned corpus, and set a probability value of the alignment.

* * * * *